May 27, 1952     J. J. COLEMAN     2,598,226
DRY CELL AND SEPARATOR THEREFOR
Filed March 3, 1950
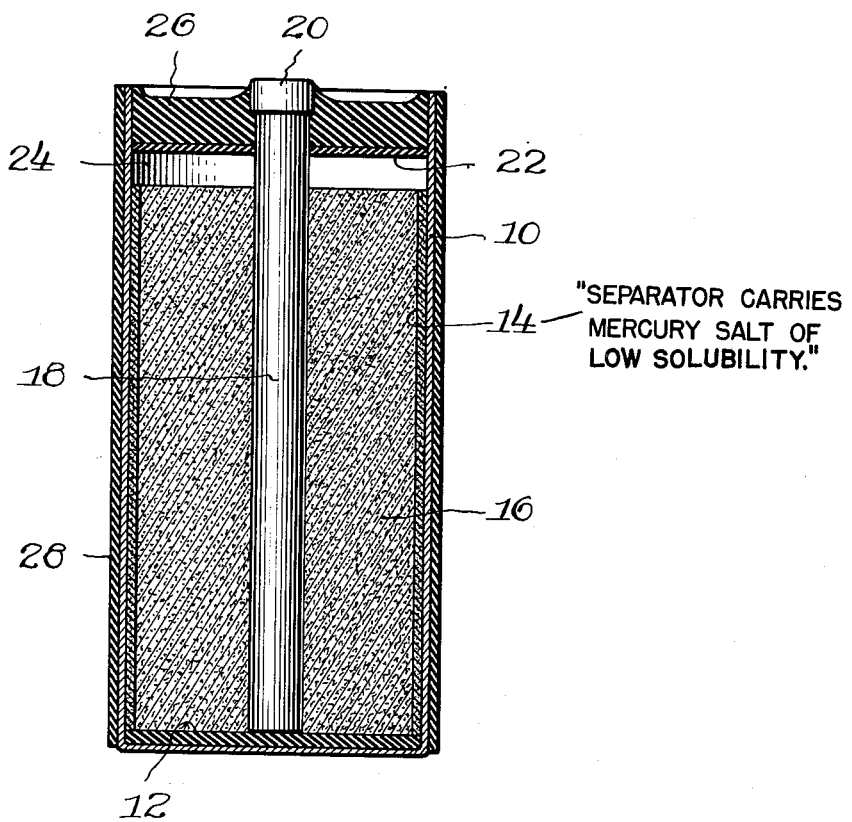
"SEPARATOR CARRIES MERCURY SALT OF LOW SOLUBILITY."
Inventor
Joseph J. Coleman,
Jones, Lesch + Darby Attys.

Patented May 27, 1952

2,598,226

UNITED STATES PATENT OFFICE 2,598,226

DRY CELL AND SEPARATOR THEREFOR

Joseph J. Coleman, Freeport, Ill., assignor to Burgess Battery Company, Freeport, Ill., a corporation of Delaware Application March 3, 1950, Serial No. 147,509

9 Claims. (Cl. 136—102)

This invention relates to improvements in dry cells and particularly to dry cells having zinc as the negative electrode, an example of which is the common and well known Leclanche cell. The invention also relates to an improved separator for arrangement between the zinc electrode and the depolarizing mix of such a cell.

In cells of the type in question, the zinc of the negative electrode is consumed by electrochemical corrosion in the operation of the cell and one of the important problems which has constantly confronted the manufacturer is to control this corrosion so that it proceeds uniformly over the area of the zinc. Uneven corrosion results in decreased output capacity and usually causes local puncturing of the zinc electrode, which is accompanied by leakage of the electrolyte and an early end of the useful life of the cell.

It is the principal object of the invention to provide an improved dry cell in which the corrosion of the zinc electrode is uniform with the result that maximum utilization is made of the zinc and high output capacity and a long useful life are obtained.

It is another object of the invention to provide an improved separator element for use between the zinc electrode and the mix of the cell, which results in the improved zinc corrosion characteristic as described.

Briefly, the benefits of the invention are accomplished by providing a separating element between the zinc electrode and the mix which initially contains a mercury salt which is soluble to only a very limited extent in water, which salt in the operation of the cell exerts a controlling effect upon the corrosion of the zinc whereby such corrosion is uniform. Mercury salts of substantial solubility in water have been used heretofore in the electrolyte of dry cells to reduce corrosion of the zinc on open circuit, but in accordance with the present invention it has been discovered that mercury salts of limited water-solubility, when incorporated in the separator between the mix and the zinc electrode, are very effective in reducing corrosion on open circuit, and also produce a uniform consumption of the zinc during operation of the cell.

In the accompanying drawing, the single figure is a vertical sectional view of a dry cell in which the improvement of the invention is incorporated.

The invention is described in connection with a dry cell of the cylindrical type such as is in common use for flashlight and other service. It is not limited to this form of cell but may be employed in any form of cell employing a zinc negative electrode and a substantially non-acid electrolyte, such as the widely used Leclanche cell. It comprises an open-top cylindrical zinc cup 10 which constitutes the negative electrode. Upon the bottom of the cup 10 is arranged a layer of non-conductive material 12, which may be a disk of paperboard or pulpboard. Lining the interior surface of the zinc electrode 10 above the layer 12 is a separating layer 14 of bibulous, non-conductive material such as porous paper or blotting paper. This separating sheet is prepared or treated in a manner so as to contain a mercury salt having limited solubility in water as will be described more in detail hereinafter.

Within the cup and in contact with the bottom layer 12 and the separating layer 14 is a mass of depolarizing mix 16, which may be of any suitable composition, such as a mixture of powdered manganese dioxide and carbon. The mix is moistened with the cell electrolyte, which may be the usual substantially neutral aqueous solution of zinc chloride and ammonium chloride. Embedded within the mix 16 is the usual upright carbon rod 18 which serves as the positive electrode of the cell. The mix 16 is in compressed condition and the layer 14 serves to separate said mix from the negative electrode 10.

The upper ends of the zinc electrode 10 and carbon electrode 18 extend above the separating layer 14 and the mix 16, and the top end of the carbon electrode has a conductive metal terminal cap 20 fitting thereon. A non-conductive top washer 22, which may be composed of paperboard or pulpboard, is arranged in spaced relation above the depolarizing mix 16 to form an expansion space 24, and a heat-fusible seal 26, which may be composed of wax or pitch, rests upon the washer 22 and forms a seal closure for the open top of the cup 10. A protective cylindrical jacket 28 of cardboard or other suitable non-conductive material encloses the side wall of the zinc electrode 10 in the manner usual with cells of this general type.

In accordance with the present invention, a mercury salt is incorporated in the bibulous separator 14 which is soluble to only a limited extent in water. The mercury salts which are suitable for the purpose of the invention are those which are soluble to an extent not exceeding about 0.1 gram per 100 grams of water at ordinary temperature (20° C.). Examples of suitable salts are mercurous chloride, HgCl, mercurous bromide, HgBr, mercurous iodide, HgI, mercurous sulfate, $HgSO_4$, and mercuric phosphate, $Hg_3(PO_4)_2$. Some of these salts are substantially insoluble in water and where this is true, it is desirable that they have a somewhat greater solubility in the cell electrolyte. For example, mercurous chloride is soluble in water to the extent of 0.21 milligrams per 100 grams of water but in a saturated aqueous solution of ammonium chloride, which is commonly present in Leclanche cells, it is soluble to the extent of more than 1.35 milligrams per 100 grams of the ammonium chloride solution. Mercuric phosphate is substantially insoluble in water and is soluble in a saturated ammonium chloride solution to the extent of 9.5 grams per 100 grams of such solution.

In accordance with the invention, the mercury salt is present in the separator 14 initially, that is, at the time of the assembly or completion of the cell. The sheet-form separator of paper may be formed in the customary process for making paper, that is, by felting the sheet out of a water suspension of wood fibers on the Fourdrinier wire of a paper-making wet machine. The mercury salt may be incorporated in the sheet by mixing the same with the fibers in the water suspension and felting the salt along with the fibers in the sheet-making operation. In this manner the salt is distributed uniformly over the area of the sheet. Other suitable methods may be employed, as spraying the sheet with a suspension of the salt, or dipping the sheet into such a suspension. After the sheet with the salt therein has been formed, it is dried and cut to pieces of the desired size for insertion in the zinc cup 10.

The amount of the mercury salt which is incorporated is not critical and, generally, the same considerations apply as when a water-soluble mercury salt is used, that is, an amount should not be used which is great enough to cause objectionable brittleness of the zinc electrode. A small amount is sufficient, as for example, an amount providing about .025 milligram of mercury per square centimeter of area of the separator 14. With mercurous chloride, an amount equal to 0.1 milligram per square centimeter of such area has been used with highly satisfactory results.

In the assembly of the cell, the absorbent separating layer 14 is introduced into the cup 10 and the mix 16 and positive electrode 18 are thereafter introduced. The moist mix is compacted by a compressing operation and is brought into pressure contact with the separator 14. Electrolyte is absorbed from the mix into the separator to render the cell operative.

When a mercury salt of limited water solubility is incorporated in the separator 14 in accordance with the invention a marked improvement in the uniformity of electrolytic corrosion of the zinc is obtained. Corrosion on open circuit is greatly reduced and consumption on closed circuit is uniform over the area of the zinc electrode. Whereas in the absence of such salt the corrosion is uneven and the local areas of the zinc are frequently punctured at an undesirably early stage, the inclusion of the mercury salt of limited water-solubility in the separator causes these difficulties to disappear and the corrosion progresses uniformly, and premature puncturing is avoided and the cell delivers a large output of energy and has a long useful life.

The action which produces the beneficial results is believed to be as follows. When the electrolyte is absorbed from the mix 16 into the layer 14 it comes into contact with the mercury salt in said layer and a substantial amount of the salt goes into solution in the electrolyte. The electrolyte also comes into contact with the zinc electrode 10 and mercury is deposited from the dissolved salt upon the zinc and amalgamates with the latter and exerts its beneficial effect. In the case of a salt having relatively low solubility in the electrolyte, such as mercurous chloride, the action still takes place with great readiness, because as the mercury is deposited on the zinc it is removed from the solution and more of the mercury salt is readily dissolved. This action continues progressively until a protective mercury factor is acquired by the zinc. The effect is substantially the same as if the solubility were much greater. A compound having a chromate or a dichromate radical and which has the property of inhibiting the corrosion of metal should not be present. This class of compounds is known, and it has been found that the presence of such a compound causes the beneficial action described herein to be undesirably retarded.

As additional advantages of the invention, the use of the mercury salt of limited water solubility avoids the injurious effects which are frequently encountered by workers engaged in cell manufacture where highly water-soluble mercury salts are used. In addition, the use of the salts of limited solubility avoids deleterious effects upon cell manufacturing equipment. When solutions containing dissolved mercury salts come in contact with metal, such as iron, brass, copper, etc. small amounts of the mercury are deposited upon the metal and cause the latter to be contaminated with the mercury with deleterious effects upon the machinery.

What is claimed is:

1. A separator for dry cells comprising a bibulous sheet carrying a mercury salt which is soluble in water to an extent not exceeding about 0.1 gram per 100 grams of water.

2. In a dry cell, the combination of a zinc negative electrode, a positive electrode, a body of mix between said electrodes, said mix being moistened with an aqueous electrolyte, a bibulous separator between said mix and said negative electrode, said separator initially carrying a mercury salt which is soluble in water to an extent not exceeding about 0.1 gram per 100 grams of water, said cell being substantially free of a compound having a radical from the group consisting of the chromate and dichromate radicals.

3. A dry cell as claimed in claim 2 in which the electrolyte contains ammonium chloride.

4. A dry cell as claimed in claim 2 in which the mercury salt is mercurous chloride.

5. A dry cell as claimed in claim 2 in which the mercury salt is mercurous sulfate.

6. A dry cell as claimed in claim 2 in which the mercury salt is mercurous bromide.

7. A dry cell as claimed in claim 2 in which the mercury salt is mercurous iodide.

8. A dry cell as claimed in claim 2 in which the mercury salt is mercurous phosphate.

9. In a dry cell of the Leclanche type having a zinc negative electrode, a positive electrode, a body of depolarizing mix between said electrodes, a non-conductive separator between said mix and said negative electrode, said mix and said separator being moistened with aqueous electrolyte, and said separator initially carrying a compound from the group consisting of mercurous chloride, mercurous bromide, mercurous iodide, mercurous sulfate and mercuric phosphate.

JOSEPH J. COLEMAN.

REFERENCES CITED

The following references are of record in the file of this patent:

UNITED STATES PATENTS

| Number | Name | Date |
| --- | --- | --- |
| 828,335 | Post | Aug. 14, 1906 |
| 1,140,826 | Hoppie | May 25, 1915 |
| 2,301,390 | Forsythe | Nov. 10, 1942 |
| 2,422,045 | Ruben | June 10, 1947 |

OTHER REFERENCES

Sholl, "The Dry Battery," 1940 edition, page 36.